Jan. 28, 1969
E. OCHYLSKI
3,423,789
ANIMAL DEHIDER
Filed Aug. 8, 1966
Sheet 1 of 4
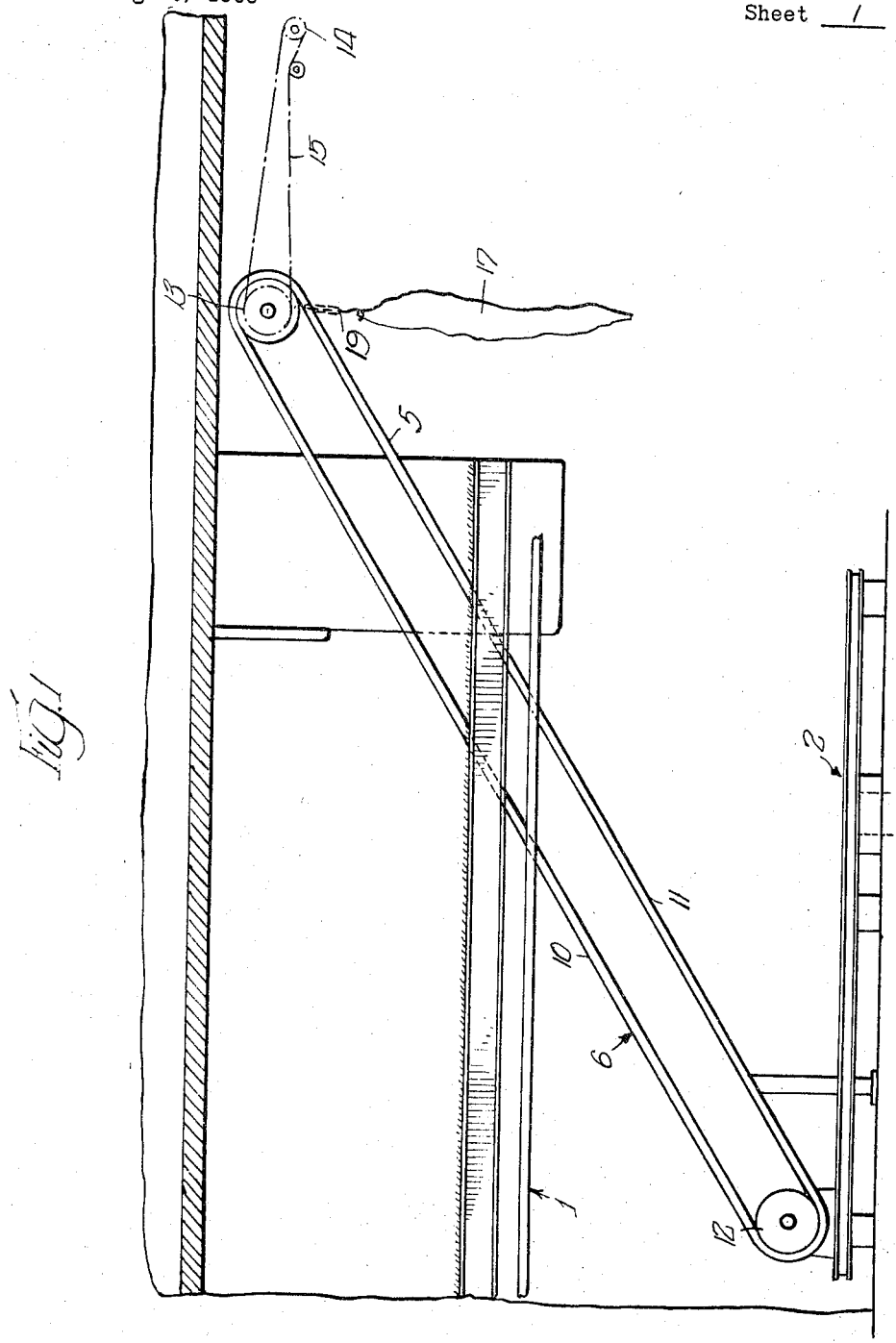
Inventor
Edward Ochylski.
By George H Simmons
atty.

Jan. 28, 1969
E. OCHYLSKI
3,423,789
ANIMAL DEHIDER
Filed Aug. 8, 1966
Sheet 2 of 4
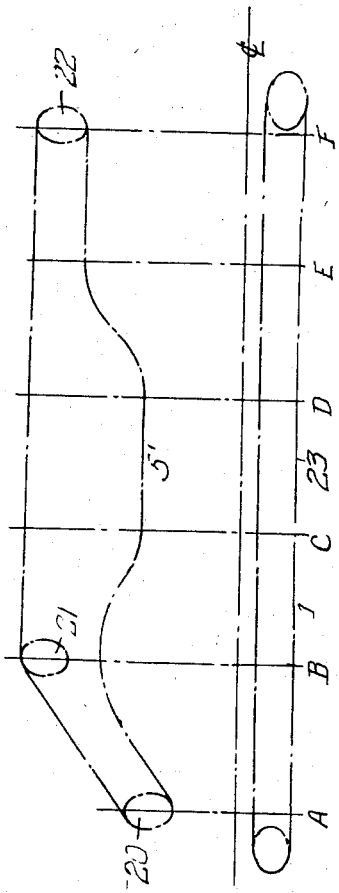
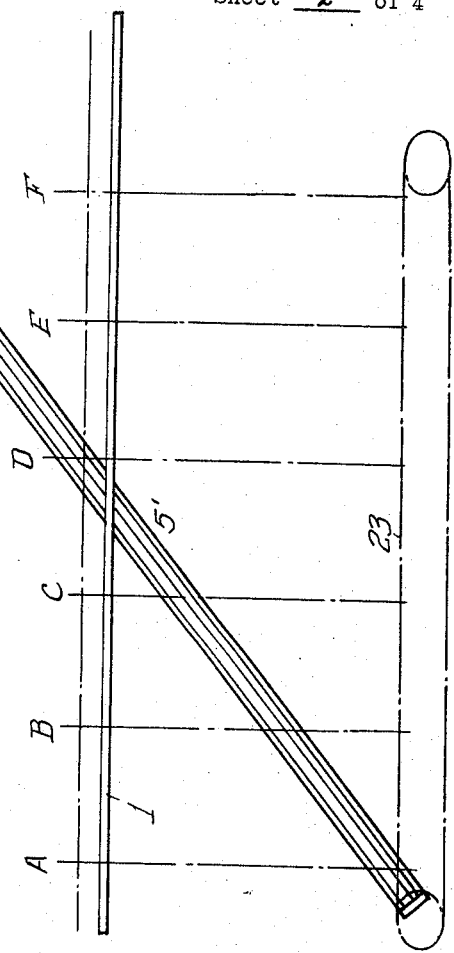
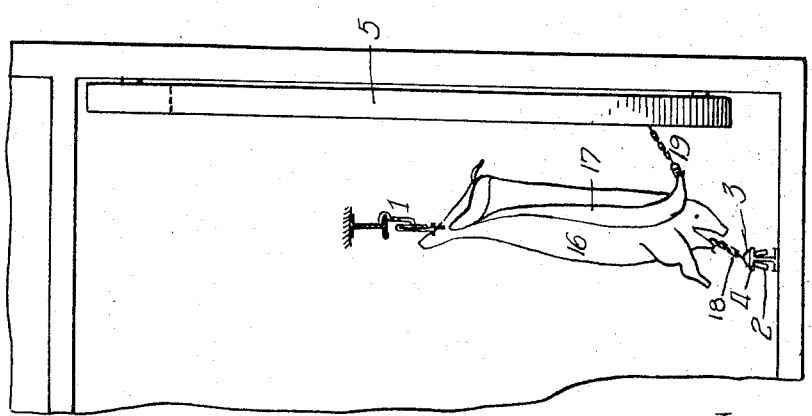
Inventor:
Edward Ochylski,
By George H. Simmons
Atty.

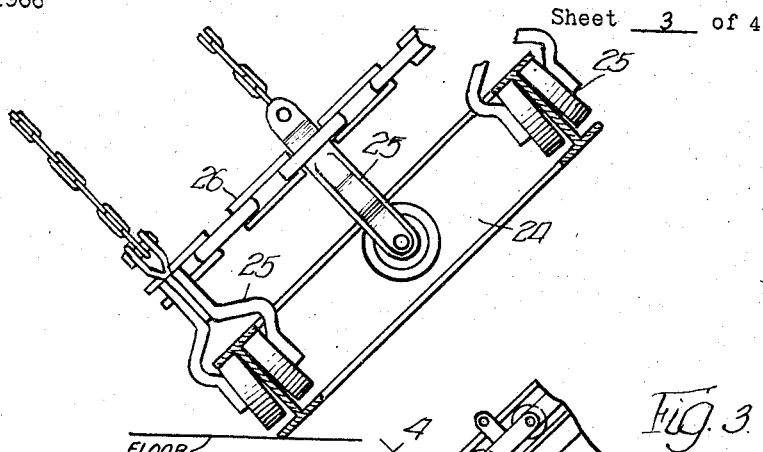
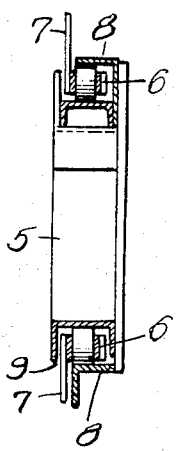
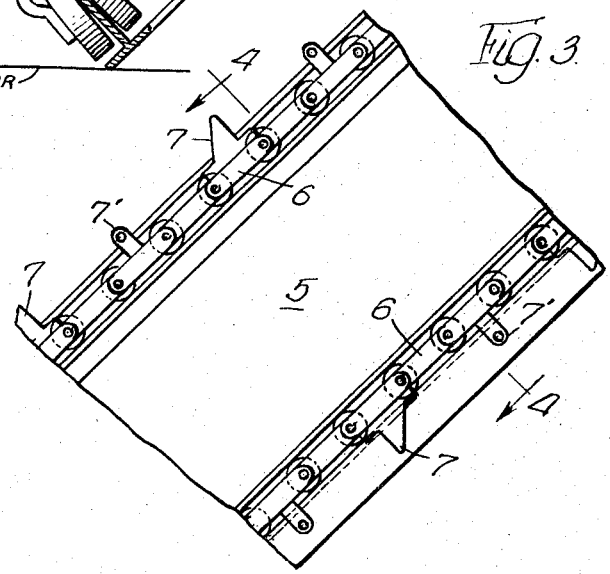
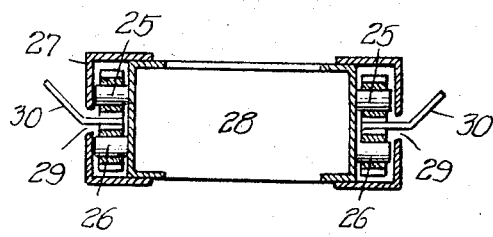
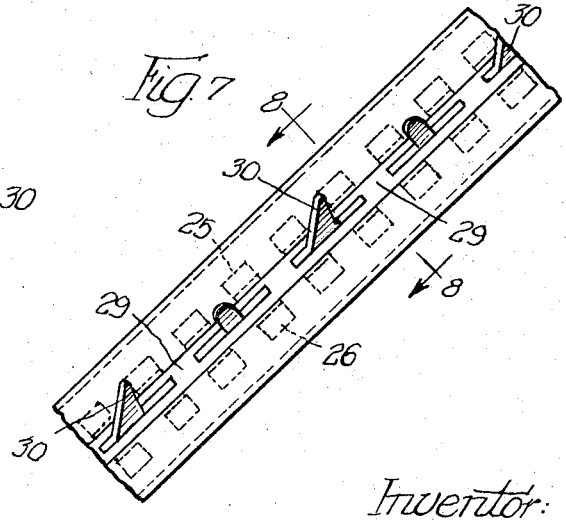

3,423,789
ANIMAL DEHIDER
Edward Ochylski, % The American Meat Packing Corporation, Union Stockyards, Chicago, Ill. 60609
Filed Aug. 8, 1966, Ser. No. 571,079
U.S. Cl. 17—21                        6 Claims
Int. Cl. A22b 5/16

ABSTRACT OF THE DISCLOSURE

Machine for dehiding carcasses that depend from a constantly moving animal suspension system and are attached at their lower ends to a constantly moving power driven anchoring means. The dehider consists of a constantly moving power driven conveyor inclined upwardly from the anchoring means to a point above the suspension system, to which conveyor preloosened hides are connected and pulled off of the carcasses as the caracasses move along the conveyor.

---

This invention relates to the dehiding of an animal carcasses in a butchering plant and has for its principal object the provision of a new and improved machine of this kind.

In the butchering and dressing of hogs, cattle, sheep and other such animals, it is common in the art to suspend the animals at their hind feet by means of hooks called gambrels. The gambrels are swiveably mounted on trolleys located on an overhead track. The trolleys and, in turn, the animals are moved by a chain conveyor having pusher plates depending therefrom, which plates push the trolleys about the killing and dressing rooms. In this manner, the animals are moved in a continuous stream to the stations in the plant where the various butchering operations are performed.

It is desirable to dress as many carcasses as possible in any given period of time since the unit cost to dress a particular carcass will decrease with any increase in the number of carcasses dressed in such period of time. It follows, therefore, that any time the overhead conveyor is stopped or slowed for a particular operation, the total number of carcasses dressed in a given period of time will be decreased.

In my experience, one of the most severe "bottlenecks" in the dressing of hogs, cattle, or the like is the cleaning and dehiding operation. Heretofore, the dehiding of a carcass has been accomplished by two basically different types of machinery. In the first type, the movement of the carcass is stopped and then secured, and the hide is stripped off by use of a hook and cable winch or similar machinery while the carcass is immobilized. In the second type, machinery for removing the hide is attached to the carcass while it is moving, and moves with the carcass during the dehiding operation. After removal of the hide, the machinery is returned to the starting position and attached to the next carcass. Examples of the former type of dehiding machinery are shown in the patent to W. C. Schmidt, No. 3,235,905, and C. O. Schmidt, Jr., No. 3,229,328. Examples of the latter are shown in Hager et. al., No. 3,187,577, and Hincks, No. 3,696,677.

The disadvantages of these machines are readily apparent. In the former, the movement of the carcass is stopped and, accordingly, the movement of the whole line is interrupted. In the latter, the machinery can dehide only one carcass at a time and, thus, the speed of the line must be made to correspond to the speed of the dehiding machine.

It is a main object of my invention to provide an animal dehider that is capable of dehiding as many carcasses as the speed of the production line will deliver to it.

It is an object of my invention to provide an animal dehider which obviates the stopping or limiting the speed of the production line for the dehiding operation.

It is a further object of my invention to provide machinery which will permit the dehiding of more than one carcass at a time.

It is a further object of my invention to provide machinery for the removal of hides of hogs, cattle and other animal carcasses which can be operated by only one operator.

It is a further object of my invention to provide an animal dehider which will pull the hide off in a lateral, as well as in an upward, direction.

When hogs, cattle and the like, and particularly cattle, enter the packing plant, their hides are normally covered with a substantial amount of dirt and the like which they pick up during transportation and storage in stockyard pens. If the animal is not dehaired prior to the dehiding operation, this dirt can fall into the carcass when the hide is being removed. This dirt is very difficult to remove from the dehided carcass and thus requires a separate operation in the packing plant process.

It has been found that if the hide is removed in a lateral as well as vertical, direction instead of just in a vertical direction, the problem of dirt falling on the dehided carcass is minimized.

Further objects of my invention will be apparent from the detailed specification and claims which follow, reference being had to the drawings in which a preferred embodiment of the invention is shown by way of example, and in which:

FIGURE 1 is an elevation of my dehider;

FIGURE 2 is an end view of the dehider showing a carcass at the initial point in the dehiding operation;

FIGURE 3 is a detailed drawing of a portion of the chain conveyor to which the hide is secured for removal from the carcass;

FIGURE 4 is a cross sectional view of the same conveyor taken along the line 4—4 of FIGURE 3;

FIGURE 5 is a diagrammatic top view of a second embodiment of my invention;

FIGURE 6 is a diagrammatic elevation of the second embodiment of my invention;

FIGURE 7 is a detail drawing of a portion of the chain conveyor to which the hide is secured for removal used in the second embodiment of my invention;

FIGURE 8 is a section of the chain conveyor shown in FIGURE 7 taken along the line 8—8.

FIGURE 9 is a detail drawing of the floor mounted chain conveyor for securing the lower portion of the carcass which is used in the second embodiment;

Figure 10:
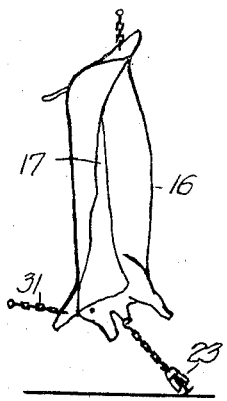
Figure 11:
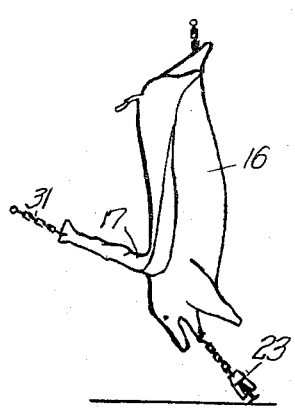
Figure 12:
Figure 13:
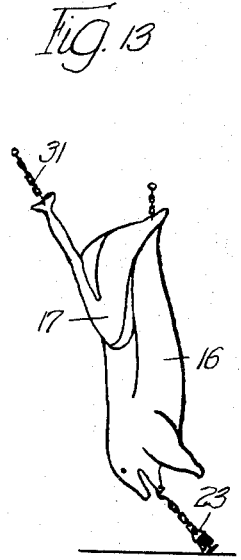
Figure 14:
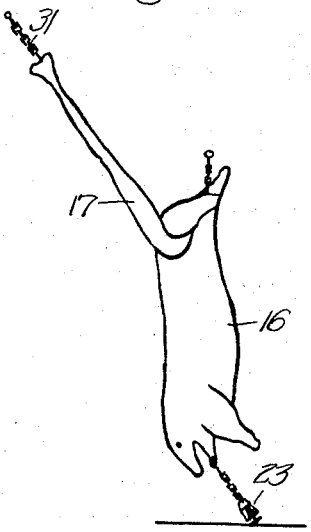
Figure 15:
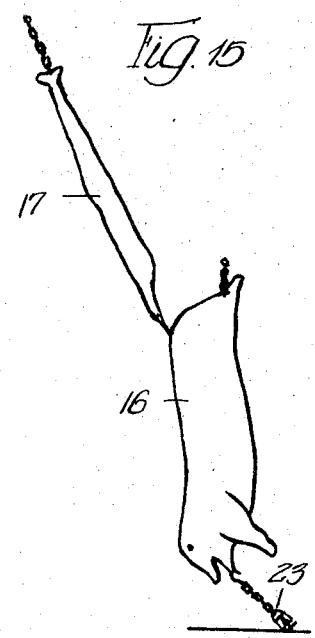

FIGURES 10 through 15 show a carcass in the various stages of dehiding using the second embodiment, FIGURE 10 taken at station A shown on FIGS. 5 and 6; FIG. 11 at station B; FIG. 12 at station D, etc.

Referring to FIG. 1, my animal dehider, as installed in a meat packing plant, is disclosed therein. A drop finger conveyor 1 which extends throughout the butchering floor of the plant is suspended from the ceiling thereof. The animals to be butchered and dressed are suspended by the use of hooks or gambrels and move along the conveyor by means of trolleys or wheels to which the hooks or gambrels are connected. The trolleys are moved by the conveyor 1 and are maintained at a convenient distance apart.

In the dehiding area of the plant, a rail or track 2 is mounted on the floor. As is seen in FIG. 2, hooks 3 are carried on trolleys 4 which are placed in surrounding relationship to the rail 2.

Mounted parallel to the conveyor 1 and the rail 2, but on the other side of said conveyor 1 from rail 2, is an endless chain conveyor numbered generally at 5, having a chain 6 mounted therein.

As shown in FIGS. 3 and 4, the conveyor 5 consists of a roller chain 6 with hooks 7' and lugs 7 welded thereto. Chain 6 is mounted in a track 8 having a channel opening 9 for lugs 7. The chain conveyor 5 consists of an upper ascending portion 10 and a lower descending portion 11. The chain 6 is reeved around sheeves 12 and 13 and is driven by a variable power means 14 connected by belt 15 to wheel 13. By use of the variable power means 14, the movement of the chain conveyor 5 can be synchronized with the movement of the carcasses along the conveyor 1. The upper ascending portion 10 of the conveyor 5 terminates at a height substantially above the drop finger conveyor 1.

Referring now to FIG. 2, a carcass 16 is shown entering the dehiding area. The hide 17 has been previously cut away from the underside of the carcass as well as the legs and neck. Since the hide is to be removed before the carcass is to be chilled and cut into various sections, there is no need to scald the carcass or to dehair the hide.

When the carcass 16 enters the dehiding area, the jaw of the carcass (or, in the case of cattle and other such animals, the forelegs) is secured to the rail 2 by suitable means such as a jaw or foreleg hook and chain 18. The chain 18 is hooked to the hook 3. When so secured, all lateral movement of the carcass is prevented. The hide 17 is then gripped by gripping means 19 which is secured to the chain 6.

The carcass continues its movement along the conveyor 1 and the lower portion of the carcass will move along the rail 2 by the use of the trolleys 4. The gripping means 19 moves upwardly with the chain 6 in the upper ascending portion 10 of the chain conveyor 5. As it moves upward, the hide 17 will be peeled slowly from the carcass. After the gripping means 19 has moved upwardly a sufficient distance from the conveyor 1, the hide will be completely stripped off. As the chain 6, with the gripping means 19, turns about the sprocket 13, the gripping means 19 will be automatically opened, by suitable means, and the hide 17 will fall clear of the conveyor and is disposed of. See FIG. 1. The gripping means 19 is carried by the conveyor 5 to the starting point to be used on another carcass. The carcass 16 moves to the next operation where the lower portion thereof is released.

It is readily apparent that once the lower part of the carcass 16 is secured to the rail 2 and the hide 17 is secured to the chain 6, the carcass moves away from the operator and he is free to attach the next carcass and hide. Accordingly, the production line is never stopped and the dehider, with single operator, can dehide a number of carcasses at the same time.

Another embodiment of my invention is shown in FIGS. 5 through 9. FIG. 5 shows a representation of the path of the chain conveyor. As shown therein, the distance between the vertical plane through the center line of the overhead conveyor 1 and points on the chain conveyor 5' is variable rather than constant. The chain of the chain conveyor 5' is reeved between sprockets 20, 21 and 22. Unlike sprockets 12 and 13, which are all in the same vertical plane, sprockets 20, 21 and 22 are all in the same lateral plane which is set at a convenient angle from horizontal as will be seen best in FIG. 6.

Instead of using a rail 2, as in my first embodiment, I use a chain conveyor numbered generally as 23. The chain conveyor 23 consists of an oblong track 24 parallel to the overhead conveyor 1. FIG. 9 shows the conveyor 23 in greater detail. It is mounted on an angle with respect to the butchering floor of the plant. Mounted on the track 24 in surrounding relationship are trolleys 25. The trolleys are connected together by means of a chain 26 and maintained at a distance which is the same distance as the trolleys of the drop finger conveyor 1. The conveyor 23 is driven from and thereby synchronized with the conveyor 1.

As is seen in FIG. 5, the chain conveyor 5' has an irregular shape. For purposes of illustration, stations A through F are indicated on FIGS. 5 and 6. Between stations A and C, the conveyor 5' has a concave portion; between stations C and D it is straight and relatively near the plane of the overhead conveyor 1; between stations D and E it curves away from the plane of the overhead conveyor; and, finally, through stations E and F, it is straight but relatively further away from the overhead conveyor 1. The reasons for the irregular shape will be explained hereafter.

FIGS. 7 and 8 show the detail of the chain conveyor 5'. It consists of two roller chains 25 and 26 pinned together in adjoining relationship. The chains 25 and 26 are placed in a channel 27 that is located on the outside of central section 28. The channel 27 has a slot 29 therein. Lugs 30 are inserted and pinned between the roller chains 25 and 26 and protrude through the slot 29.

The concave portions between stations A and C and the curved portions between stations D and F of the conveyor 5' are used to impart a lateral as well as a vertical component to the force employed in dehiding the carcass. This can be seen from FIGS. 10 through 15. These figures depict a hog carcass at the various stations during the hide removing operation. FIG. 10 shows the carcass at station A; FIG. 11 at station B, etc. The carcass enters the dehiding area in the same manner as previously described and is secured to the chain conveyor 23 in the same manner. The hide 17 is secured by a hook and chain link 31 to one of the lugs 30 disposed in the chain conveyor 5'. See FIG. 10. Because of the concave portion of the conveyor, as the carcass moves through stations A, B and C of the conveyor 5', the hide is pulled in a lateral as well as a vertical direction. This is shown in FIGS. 10 and 11. As shown in FIG. 12, when the carcass passes by the straight portion, the hide is pulled in a more vertical rather than a lateral direction. Then, as it passes by the curved portion between stations D and E, a greater lateral force is applied and the hide is pulled away from the carcass rather than just upwardly. See FIG. 14. By use of the straight portion between stations E and F, the hide is pulled up and away from the carcass until it is completely removed. See FIG. 15. After the gripping means 31 moves around the sprocket 22, it open automatically and the hide drops clear of the conveyor 5' and is disposed of.

This embodiment of my invention incorporates the same speed and labor saving advantages as the first embodiment. This dehider is operated by one man and can dehide more than one carcass at a time. The provision of an irregular shape to the chain conveyor 5' provides further advantages. It has been found that if a hide is pulled in a lateral direction just as the dehiding operation begins, there is less tendency for the hide to tear and less fat is removed from the animal. The concave portion between stations A and C on the conveyor 5' moves the gripping means 31 away from the carcass 16 and thus imparts a lateral pull to the hide 17. Also, it has been found that if the hide is pulled away as well as upwardly from the carcass toward the end of the dehiding operation, the amount of dirt that may fall from the hide into the carcass is greatly reduced. The curved portion and the straight portion between stations D and F of the conveyor 5' move the gripping means 31 upward and away from the carcass 16 and therefore pulls the hide 17 up and away as the hide is completely removed.

Having thus complied with the statutes and shown and described a preferred embodiment of my invention, what I consider new and desire to have protected by Letters Patent is pointed out in the appended claims.

What is claimed is:
1. An animal dehider comprising,
a constantly moving animal suspension system from which carcasses are suspended and by which said carcasses are moved through the dehider at a uniform rate;
a constantly moving power driven anchoring means mounted approximately below said animal suspension system;
means for connecting the lower part of said carcasses to said movable anchoring means to hold the carcasses against movement laterally with respect to the travel thereof;
a constantly moving power driven hide removing means mounted adjacent to said animal suspension system and said movable anchoring means;
and a plurality of means carried by said hide removing means for connecting the hides of said carcasses to said hide removing means to remove the hides from the carcasses as they move along the hide removing means at a uniform rate.

2. An animal dehider as set forth in claim 1, wherein the movable anchoring means consists of a track mounted beneath said constantly moving animal suspension system and having power driven wheeled hooks disposed thereon for engagement with the means for securing the lower part of said carcasses.

3. An animal dehider as set forth in claim 1, wherein the movable anchoring means consists of a constantly moving power driven conveyor mounted beneath said animal suspension system and synchronized therewith, said conveyor having hooks disposed therein for engagement with the means for securing the lower part of said carcasses.

4. An animal dehider as set forth in claim 1, wherein said movable hide removing means consists of a power driven conveyor beginning at a low point near said anchoring means and ascending to a point substantially above said animal suspension system.

5. A hide remover for the dehiding of an animal carcass by pulling the hide upward and away from said carcass, comprising,
a continuously moving overhead animal suspension system from which the carcasses are suspended and extending through the dehiding area so as to move the carcasses through the dehider area at a constant rate,
a continuously moving anchoring means mounted approximately below the continuously moving animal suspension system,
means for securing the lower part of said carcass to said anchoring means,
a continuously moving hide removing means mounted in an angular plane to the continuously moving animal suspension system and the continuously moving anchoring means,
means for securing the hides of said carcasses to said hide removing means,
said hide removing means ascending from a point near the continuously moving anchoring means to a point substantially above said continuously moving overhead animal suspension system,
said hide removing means being arranged to exert a pull on the hide through said securing means, first mainly in an outwardly direction, then mainly in an upwardly direction, and then simultaneously outwardly and upwardly so as to completely remove the hide from the carcass as the carcass moves continuously through said dehiding area at said constant rate.

6. An animal dehider as set forth in claim 5 in which the hide removing means contains
a concave portion for moving said securing means away from said anchoring means, both upwardly and laterally,
a straight portion for moving the securing means only upwardly, and
a curved portion followed by a straight portion for controlling the pull on said securing means during the remainder of its travel through the dehiding area.

References Cited

UNITED STATES PATENTS 3,274,639   9/1966   Knauss _____ 17—21

FOREIGN PATENTS 1,346,412   11/1963   France.
142,904   3/1962   U.S.S.R.

OTHER REFERENCES

Russian Meat Industry, The National Provisioner, vol. 146, No. 11, p. 18, Mar. 17, 1962.

LUCIE H. LAUDENSLAGER, *Primary Examiner.*

U.S. Cl. X.R.

17—45